No. 859,619.
PATENTED JULY 9, 1907.
J. R. ROGERS.
LINOTYPE MACHINE.
APPLICATION FILED JULY 30, 1906.
2 SHEETS—SHEET 1.
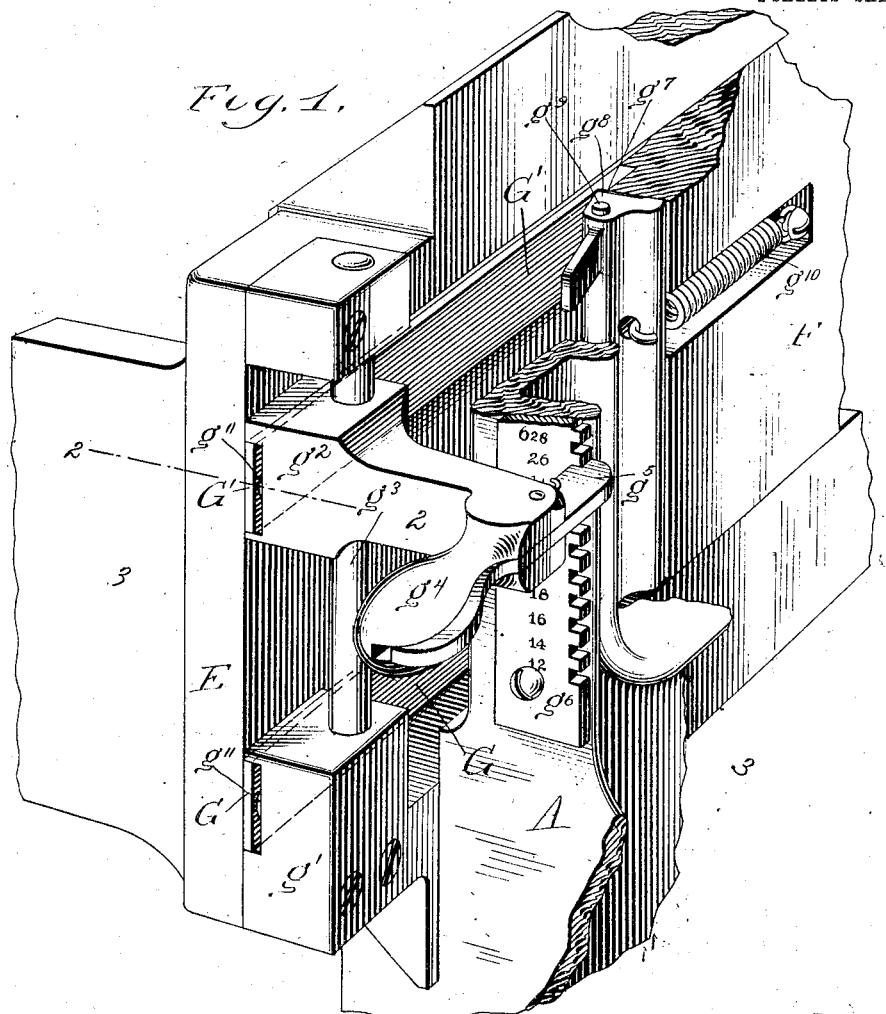
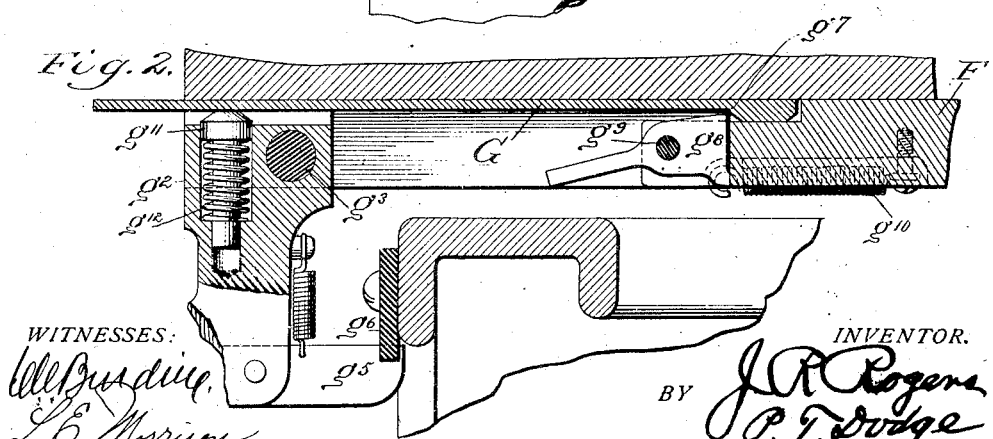
WITNESSES:
INVENTOR.
J. R. Rogers
BY P. T. Dodge
ATTORNEY.

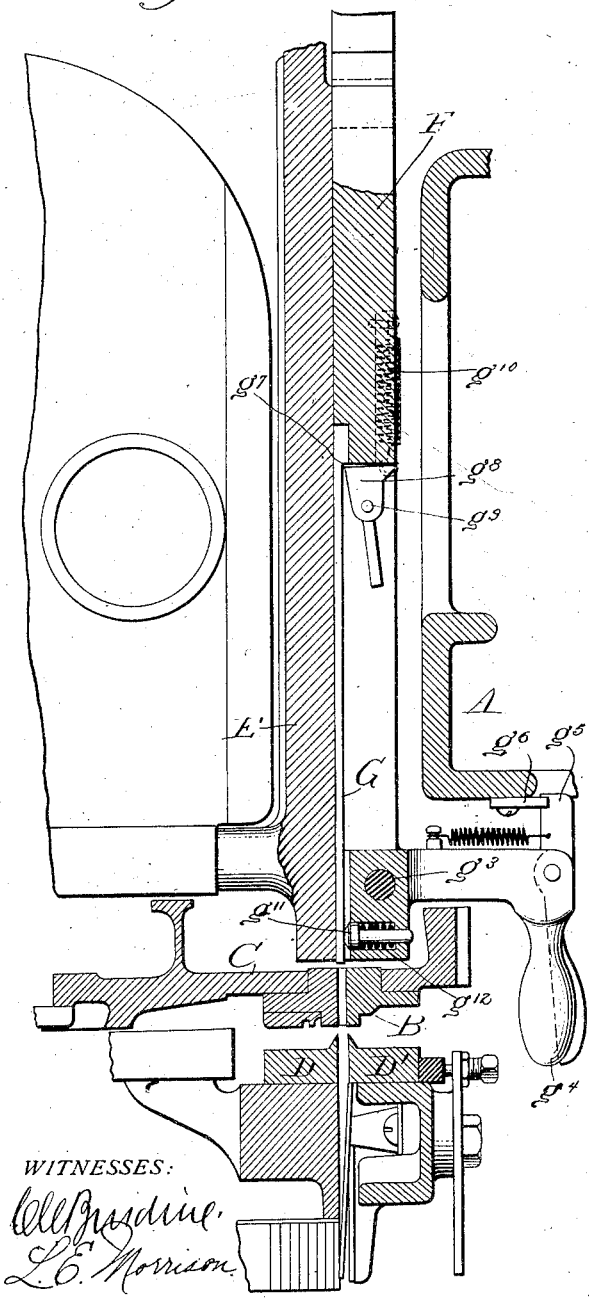

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

LINOTYPE-MACHINE.

No. 859,619.     Specification of Letters Patent.     Patented July 9, 1907.

Application filed July 30, 1906. Serial No. 328,384.

*To all whom it may concern:*

Be it known that I, JOHN RAPHAEL ROGERS, a citizen of the United States, and a resident of the borough of Brooklyn, county of Kings, and State of New York, have invented a new and useful Improvement in Linotype-Machines, of which the following is a specification.

My invention has reference to linotype machines and kindred machines wherein linotypes or printing-bars, each bearing a series of type in one edge, are cast in a continuously slotted mold against a composed line of matrices presented momentarily to the mold, the slugs being subsequently delivered from the mold into the receiving-galley by a reciprocating ejector-blade, as shown for example in U. S. Letters Patent No. 436,532.

In the operation of these machines, it is frequently necessary to change the length of the slugs produced. This necessitates a change in the length of the mold-slot and a corresponding change in the width of the ejector-blade, the custom being to remove one blade and substitute another of appropriate width.

The aim of the present invention is to overcome the necessity for substituting ejectors, and to this end relates to an ejector adjustable in width at will to correspond with the varying length of the mold-slot, so that the one ejector may be used for delivering slugs of different lengths.

I construct my ejector of two or more distinct parallel blades or fingers, adapted to pass through one and the same mold-slot, and so connected at their rear ends with an actuating-slide or carrier, that the distance between the fingers may be varied according to the length of the mold slot, and this to the end that the ejecting pressure may be applied by the respective blades at the ends of the slug and also at intermediate points if required. With the blades thus changeable in their relations, I combine means by which their separation may be instantly and definitely varied, and means whereby they may be locked in the required relations.

I believe myself to be the first to combine in an ejector two parallel blades or sections and means or mechanism for moving one of these blades transversely in relation to the other, so as to vary the width of the ejector as a whole. I also believe myself to be the first to combine with a reciprocating ejector-blade a guide through which it travels, and by which its path is determined, said guide being movable transversely of the blade in order to change the path of movement.

Owing to the fact that the mold presents at all times a thin or narrow slot through which the ejector must pass, the guiding and the adjusting devices are connected with the blades at their rear ends, or at points which do not pass through the mold.

In the accompanying drawings I have illustrated my ejector in a form adapted for application to Mergenthaler linotype machines in their present commercial forms. I have limited the drawings to those parts which are immediately associated with my invention, and it is to be understood that all other parts of the machine may be of any ordinary or suitable construction.

In the drawings,—Figure 1 is a perspective view, looking from the front, portions being broken away to show the internal construction. Fig. 2 is a horizontal section on the line 2—2, Fig. 1. Fig. 3 is a horizontal section on the line 3—3, Fig. 1, through the ejector and the usual mold and slug trimming knives. Figs. 4 and 5 are side elevations in outline, showing the ejector adjusted for the delivery of a long slug, and for the delivery of a short slug respectively. Fig. 6 is a side elevation in outline of an alternative construction, with three blades or sections instead of two.

Referring to the drawings, A represents a portion of the main frame of a linotype machine; B the slotted mold in which the slugs or linotypes are cast; C a vertical intermittingly rotated wheel or disk giving support to the mold and serving to carry the same from the horizontal casting position and to the vertical ejecting position. D and D' are two fixed parallel knives between which the slugs are delivered in passing from the mold. E is a horizontal mold-slide, so-called, mounted in the main frame and giving support to the journal of the mold-wheel or disk C. The foregoing parts are all of ordinary construction.

Referring now to my improvement, F represents a horizontal ejector slide mounted and guided as usual in one side of the mold-slide E. Instead of providing the slide F as usual, with a single detachable blade of a width equal to the length of the mold-slot, I divide the ejector longitudinally into two distinct or independent blades or slides G and G', both of which operate to eject each slug, these blades being so mounted that the distance between them may be varied at will to correspond with the varying length of the mold and the slugs produced therein. The lower blade G is secured at its rear end to the slide F in position to pass through a fixed guide $g'$ in the slide E and through the lower end of the mold-slot,—this end being usually fixed or unchangeable as to location. The upper blade G' is connected at its rear end to the actuating slide F in such manner that it may be raised and lowered edgewise, and at its forward end it is extended through a guide $g^2$ mounted to slide vertically on a rod $g^3$ fixed to the mold-slide E. The guide $g^2$ serves not only as a means of sustaining and guiding the blade G', but also as a means of raising and lowering the same in relation to its companion G, so that it may be set in position to pass through the upper end of the mold-slot whatever the length of the latter may be. The mold-slide may be varied in length by changing the location of its upper end, as usual, and it is for this reason that the upper blade G' is adjustable vertically while the lower blade G is non-adjustable under ordinary conditions.

In the commercial operation of the machine, it is necessary that the adjustment of the ejector to correspond with the change in the length of the mold should be effected instantly and definitely, and that it should be secured in the proper position. For this purpose I propose to combine with the adjustable blade any suitable means or mechanism for effecting its movement to and from its companion. To this end the guide $g^2$ is fashioned at one end into a handle $g^4$ extended within convenient reach of the operator, so that it may be readily raised and lowered to change the height of the guide $g^2$ and the path of the blade G′. In this handle there is pivoted the spring-actuated latch $g^5$, one end of which engages in the notched edge of a vertical plate $g^6$ secured to the frame for the purpose of holding the guide and the adjustable blade in their required positions. The notches are numbered and are so spaced that they admit of the blade G′ being fixed in predetermined positions, corresponding to the standard lengths or measures of the slugs commonly produced in the machine.

The adjustable blade may be connected with the actuating slide F, or other actuating device, in any manner which will permit of its being readily raised and lowered. In the construction shown, the rear end of the blade is seated against a supporting shoulder on the slide F, and near its rear end the blade is provided with a vertical shoulder $g^7$ and engaged by an upright latch-bar $g^8$ connected with the slide F by a vertical pivot $g^9$ and acted upon by a spring $g^{10}$ by which it is caused to engage automatically behind the shoulder $g^7$ when the blade is inserted from the front, in order to compel the blade to move rearward with the slide F.

The latch-bar $g^8$ is formed with a finger-piece by means of which it may be rocked around its vertical pivot in order to release the blades G and G′ and admit of its being withdrawn endwise from the machine when it is required to substitute blades of different thickness, as is sometimes necessary when the machine is adjusted to greatly change the thickness of the slugs produced therein.

It is to be noted that the above arrangement of parts admits of the blade G′ moving upward and downward in relation to the slide F and locking-dog $g^8$, without disturbing the connection between them. The lower blade G has its rear end of the same form as that of the upper blade and it it is engaged and held in like manner.

In order that the two blades with their thickened rear ends may be drawn through the guides $g′$ and $g^2$ for removal, the guides are made with slots of sufficient size to permit the passage of the thickened ends. Each guide is provided with a pressure plunger $g^{11}$, urged forward by a spring $g^{12}$ and bearing on the side face of the blade, as shown in Fig. 2. The plungers, while holding the blades to their proper bearings when in action, will yield and permit the passage of the thickened rear ends when the blades are pulled strongly forward after being unlocked from the slide F.

When the mold B is adjusted to provide a long slot and produce a long slug, the latch $g^5$ is disengaged and the guide $g^2$ raised by means of the handle $g^4$ until the upper edge of the blade G′ is in position to pass through the extreme upper end of the mold-slot, when the latch is permitted to re-engage and thus hold the blade and its guide in position, so that the blade will act upon and deliver the upper end of the slug X while the lower end of the slug is being acted upon and delivered by the lower blade G. When, on the other hand, the mold is adjusted for the production of a short slug X, the blade G′ is lowered, as shown in Fig. 5, so that it will act on the upper end of the same, the lower blade G remaining in its original position.

It will be understood that the two blades G and G′, advancing against the base of the slug, will co-operate in delivering the same from the mold and between the knives D and D′ into the receiving galley in the same manner as the slugs have been heretofore delivered by single wide blades.

It is to be understood that the provision for detaching the blades from the actuating slide is not of the essence of my invention, and that for many classes of work it is usual to retain a blade of given thickness, although there may be change in the thickness of the slugs produced.

When it is required to eject slugs of great length, it may be desirable to use intermediate ejector blades to apply pressure to the slug at or near its middle. To this end my ejector may be constructed with three or more blades or fingers in connection with any suitable mechanism for effecting their automatic and equal separation. An ejector of this character is shown in Fig. 6, in which the construction is the same as that in the preceding figures, except that the third intermediate blade $G^2$ is used in connection with a guide $g^{13}$ connected by links $g^{14}$ with the guides of the other blades, so that when the guide $g^2$ is raised or lowered, it will cause the intermediate guide $g^{13}$ to move in like manner but through one-half the distance. In this manner the three blades may be uniformly spaced under all adjustments so as to act respectively at the two ends and the middle of the slug X.

I am aware that an ordinary ejector blade has been divided at its forward end and one portion connected to the other by a transverse sliding joint so as to admit of the width being changed, the adjustment being effected by grasping the movable portion in one hand while controlling a locking latch with the other, but such structure differed from that herein in that it did not comprise two distinct blades or sections or any distinct means or mechanism for instantly adjusting and securing the movable ejecting member, nor did it provide for giving support directly behind the uppermost part of the ejector when of the maximum width.

Having described my invention, what I claim and desire to secure by Letters Patent is:—

1. In a linotype machine, an ejector comprising two distinct parallel blades and mechanism for instantly moving one blade transversely in relation to the other to change the distance between them.

2. In a linotype machine, an ejector comprising plural blades, means distinct from the blades for moving one blade transversely in relation to the other, and means for securing the blades in their different relations.

3. In a linotype machine, the combination of an actuating slide, plural ejector-blades each connected to said slide, and means for changing the distance between the blades and securing them in their different relations.

4. In a linotype machine, an ejector comprising a series of parallel co-operating blades, means for reciprocating the blades endwise, and mechanism for uniformly and instantly separating the blades transversely to their line of reciprocation.

5. In a linotype machine, the combination of an ejector-blade and a guide through which the blade reciprocates in action, said guide mounted for movement at will in a direction transverse to the movement of the blade; whereby the blade may be caused to travel in one path or another at will.

6. In a linotype machine, an ejector-blade, a reciprocating slide to actuate the same, and a guide for the blade movable to change the path of the blade and its relation to the actuating slide.

7. In a linotype machine, the combination of an ejector-blade, a laterally movable guide therefor, the graduated locking-plate and a locking device engaging the same.

8. The combination of co-operating parallel ejector-blades, mechanism distinct from the blades for changing the distance between them at will, and means for locking the parts to hold the blades in their adjusted relations.

9. In a linotype machine, the combination of co-operating parallel ejector-blades, and means for laterally and relatively adjusting them for predetermined measures and for confining them in their adjusted relations.

10. In combination, the shouldered ejector-blade, the actuating-slide, and the spring-actuated latch-bar attached to the slide and adapted to permit edgewise adjustment of the blade.

11. An actuating-slide and an ejector-blade in combination with a transverse sliding connection; whereby adjustment of the blade edgewise in relation to the slide is permitted without disconnection therefrom.

12. In combination, a series of co-operating ejector-blades and means for uniformly separating the blades; whereby they may be caused to act respectively on the ends and the middle portion of slugs of different lengths.

13. In a linotype machine, the combination of a mold-carrying slide E, an ejector-slide F seated therein, an ejector-blade connected to the slide F and movable edgewise in relation thereto, and a guide for the ejector-blade movably mounted on the slide E.

In testimony whereof I hereunto set my hand this twenty eighth day of July, 1906, in the presence of two attesting witnesses.

JOHN R. ROGERS.

Witnesses:
DAVID S. KENNEDY,
ROBERT G. CLARK.